(No Model.)
P. T. RIPLEY.
COUPLING FOR BICYCLES.
No. 605,799. Patented June 14, 1898.
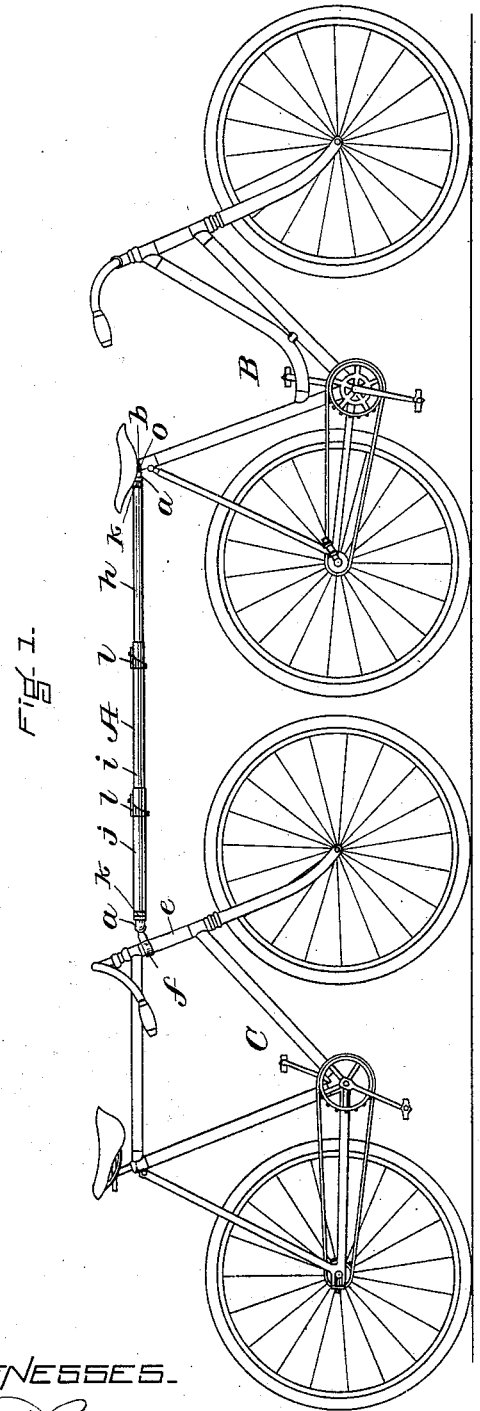
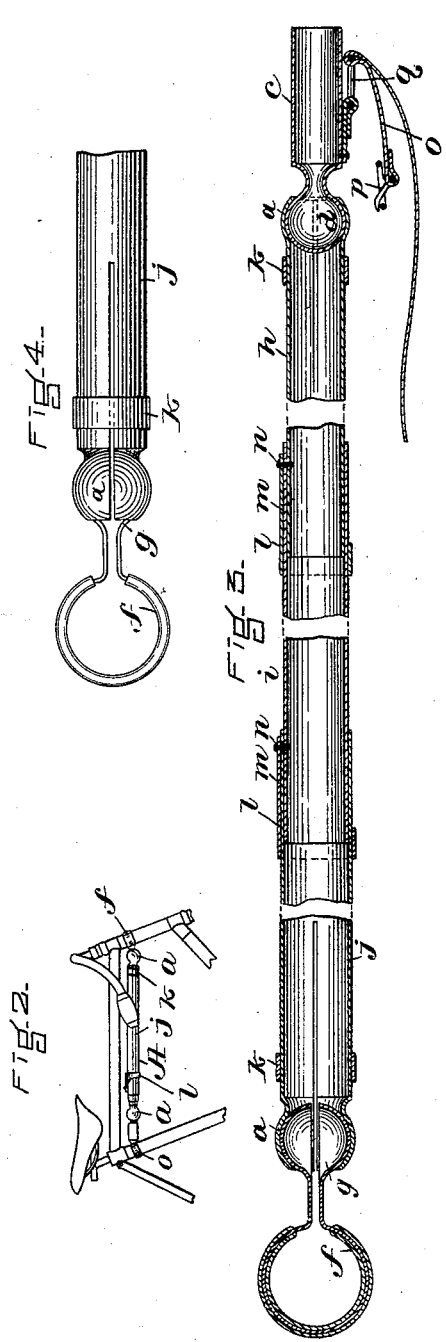
WITNESSES
A. D. Grover
Fred E. Dorr
INVENTOR
Prentiss T. Ripley
per Edw. Drummer, Atty.

UNITED STATES PATENT OFFICE.

PRENTISS T. RIPLEY, OF CAMBRIDGE, MASSACHUSETTS.

COUPLING FOR BICYCLES.

SPECIFICATION forming part of Letters Patent No. 605,799, dated June 14, 1898.

Application filed April 19, 1897. Serial No. 632,861. (No model.)

*To all whom it may concern:*

Be it known that I, PRENTISS T. RIPLEY, a citizen of the United States, residing at Cambridge, in the county of Middlesex and State of Massachusetts, have invented a new and useful Coupling for Bicycles, of which the following is a specification, reference being had to the accompanying drawings.

The object of my invention is to provide means for connecting two bicycles, one forward of the other, in such a manner that either bicycle may be readily propelled and guided by the rider thereon and that the rider on either bicycle may assist in propelling the other bicycle, the invention consisting in a coupling constructed and combined with bicycles, as hereinafter described, and specifically pointed out in the claims.

In the drawings, Figure 1 shows two bicycles connected by a coupling embodying my invention. Fig. 2 shows the coupling closed up in such a manner as to be carried on one bicycle when not in use for connecting the bicycles. Fig. 3 is a longitudinal central section of several parts of the coupling; and Fig. 4 is an external view of one end of the coupling, Figs. 4 and 5 being drawn on a larger scale than the other figures.

The coupling A is shown in Fig. 1 as connecting a lady's bicycle B forward and a bicycle C at the rear. In order that each bicycle may be guided independently of the other, I provide a universal joint $a$ near the point of connection of the coupling with each bicycle. This I prefer to be substantially a ball-and-socket joint. I also prefer to have the forward end of the coupling connected directly with the horizontal part of the seat-post $b$. For this purpose I make the end portion $c$ of the coupling tubular to slip onto said part of the seat-post, the ball-like part $d$ and tube $c$ being formed of one piece, as shown. The rear end of the coupling I prefer to connect directly with the steering-head $e$ by making the end portion $f$ of the coupling in the form of a spring-clasp to encircle said head and the ball-like part $g$ divided, as shown.

In order that the coupling can be shortened, so as to be easily carried on one bicycle when not in use for connecting two bicycles, I make the body of the same of several pieces, which may be placed one upon another longitudinally, preferably by having said parts tubular, so as to slide one within another. Thus I have shown said body as formed of three tubes—one, $h$, to slide into the middle tube $i$ and these to slide into the other end tube, $j$. Each of the end tubes is shaped at the outer end to form a socket for the ball of the part connected directly with the bicycle. This socket may be struck up out of the material of the tube, which is slitted the required distance to allow the parts of the tube and socket to receive the ball. After each ball has been entered into its corresponding socket a ferrule $k$ is slipped on the tube to encircle the same near the socket to retain the ball therein. When the coupling is extended the required distance, the tubes are retained in their relative position by clasps $l$, each of which slides on the corresponding tube and has spring extension $m$, provided with a pin $n$, which is thrust into coincident holes in the two contiguous tubes and held therein by the spring. To prevent the tubular part $c$ from slipping off from the seat-post, a strap $o$, provided with a buckle $p$, is thrust through a loop $q$, secured to the part $c$, and being carried around the seat-post is buckled, as shown.

Owing to the construction as described the whole coupling may be of light weight and may be quickly and easily adjusted, so as to connect the bicycles one forward of the other. The rider on either wheel, particularly the one on the rear wheel, may greatly assist the other rider without interfering with the guidance of either wheel by the rider thereon. By detaching one end of the coupling from one wheel, as from the forward wheel B, shortening the coupling, as above set forth, and attaching the same to the seat-mast tube of the other bicycle by means of the strap, so that it will be held under the upper tube of the frame, as shown in Fig. 2, the coupling may be readily carried when not in use for connecting the bicycles and will add but little to the weight of the bicycle.

I claim as my invention—

1. A coupling for connecting two bicycles (one forward of the other), formed of parts and having universal joints at its ends, one of said parts being provided with means for securing it to the frame of one bicycle, and another of said parts provided with a tubular portion to enter upon the seat-post of the other bicycle, substantially as set forth.

2. In a coupling for connecting two bicycles, one forward of the other, the combination of several tubes, one to slide within another, a clasp and pin to maintain the tubes in suitable relation to each other when extended, a piece connected with one of said tubes by a ball-and-socket joint and provided with a tubular part to enter upon the seat-post, a piece connected with another of said tubes by a ball-and-socket joint and provided with a clasp to encircle the steering-head, and means as a strap for retaining said tubular part on the seat-post, substantially as specified.

PRENTISS T. RIPLEY.

Witnesses:
 EDW. DUMMER,
 F. S. CHASE.